(12) United States Patent
Hung et al.

(10) Patent No.: US 11,359,943 B2
(45) Date of Patent: Jun. 14, 2022

(54) SENSOR SYSTEM INTERCONNECT FOR AUTOMATIC CONFIGURATION

(71) Applicant: MediaTek Inc., Hsinchu (TW)

(72) Inventors: Chih-Ming Hung, San Jose, CA (US); ChiaYu Lin, Hsinchu (TW)

(73) Assignee: MediaTek Inc.

( * ) Notice: Subject to any disclaimer, the term of this patent is extended or adjusted under 35 U.S.C. 154(b) by 234 days.

(21) Appl. No.: 16/280,018

(22) Filed: Feb. 19, 2019

(65) Prior Publication Data

US 2019/0257676 A1   Aug. 22, 2019

Related U.S. Application Data

(60) Provisional application No. 62/633,116, filed on Feb. 21, 2018.

(51) Int. Cl.
*G01D 18/00* (2006.01)
*G01D 21/00* (2006.01)

(52) U.S. Cl.
CPC ............. *G01D 18/00* (2013.01); *G01D 21/00* (2013.01)

(58) Field of Classification Search
CPC ............................... G01D 18/00; G01D 21/00
See application file for complete search history.

(56) References Cited

U.S. PATENT DOCUMENTS

| 7,045,996 | B2 | 5/2006 | Lyon et al. | |
| 2015/0095733 | A1 | 4/2015 | Pyeon et al. | |
| 2018/0275800 | A1* | 9/2018 | Hu | G06F 1/1601 |
| 2019/0041504 | A1* | 2/2019 | Yu | G01S 15/87 |

FOREIGN PATENT DOCUMENTS

| CN | 201600454 U | * | 10/2010 |
| CN | 105699979 A | | 6/2016 |
| DE | 102014211074 A1 | | 12/2015 |
| DE | 102014112729 A1 | | 3/2016 |

OTHER PUBLICATIONS

Jiang, Shi-feng, Wang, Meng-qian, Wei, Sen, Alarming System of Reverse Sensor Without Main Frame, 2016 (Year: 2016).*
European Patent Office, Search Report for EP Patent Application No. 19158508.2, dated Jun. 21, 2019.
China National Intellectual Property Administration, Office Action for China Patent Application No. 201911114458.9, dated Jul. 30, 2021.

* cited by examiner

*Primary Examiner* — Natalie Huls
*Assistant Examiner* — Michael J Singletary
(74) *Attorney, Agent, or Firm* — Han IP PLLC; Andy M. Han

(57) ABSTRACT

Various examples pertaining to a sensor system interconnect for automatic configuration of sensors of the sensor system are described. A sensor senses at least one parameter. The sensor also determines its respective position among a series of sensors. Based on a result of the determining, the sensor performing either a first procedure, responsive to the sensor being a first sensor in the series of sensors, or a second procedure, responsive to the sensor not being the first sensor in the series of sensors. The first procedure involves the sensor transmitting first data of the sensed at least one parameter via a second input/output (I/O) pin of the sensor. The second procedure involves the sensor receiving second data from a preceding sensor in the series of sensors via a first I/O pin of the sensor and transmitting the first data and the second data via the second I/O pin.

18 Claims, 6 Drawing Sheets

SENSOR SYSTEM INTERCONNECT FOR AUTOMATIC CONFIGURATION

CROSS REFERENCE TO RELATED PATENT APPLICATION(S)

The present disclosure is part of a non-provisional application claiming the priority benefit of U.S. Patent Application No. 62/633,116, filed on 21 Feb. 2018, the content of which is incorporated by reference in its entirety.

TECHNICAL FIELD

The present disclosure is generally related to sensors and, more particularly, to a sensor system interconnect for automatic configuration of sensors of the sensor system.

BACKGROUND

Unless otherwise indicated herein, approaches described in this section are not prior art to the claims listed below and are not admitted as prior art by inclusion in this section.

In a multi-drop shared-connection sensor network, each sensor of the sensor network typically needs a unique identification (ID) or address for identification purposes. One example application is a sensor system used in an automatic parking assistance system (PAS). In one approach, sensors are assigned IDs during sensor installation onto a vehicle (e.g., in an automobile factory). However, as this process is usually done manually, it tends to be time consuming and hence costly. In another approach, IDs can be assigned (e.g., by pre-programming) during sensor production, but this process tends to be costly due to inventory control. In yet another approach, multiple sets of wires are used with each set of wire for a respective sensor. However, the cost and weight of the multiple wires/cables are of concern. In addition to aforementioned issues, due to transmit coding, physical locations and sequence of sensors are also critical yet can often cause mistakes. Even when IDs of the sensors are pre-programmed, mistakes could still happen during installation such as, for example, incorrect sequence and/or incorrect locations (e.g., due to human error).

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions, schemes, concepts, methods and apparatus pertaining to sensor system interconnect for automatic configuration. In particular, the present disclosure aims to provide a cost-effective solution that removes ID assignment requirements. Moreover, a sensor system in accordance with the present disclosure can be seen as an electronic control unit (ECU)-less system as it does not involve expensive processors or complicated electronics.

In one aspect, a method implementable in a sensor may involve sensing at least one parameter. The method may also involve determining a respective position of the sensor among a series of sensors. Based on a result of the determining, the method may further involve performing either a first procedure, responsive to the result of the determining indicating the sensor being a first sensor in the series of sensors, or a second procedure, responsive to the result of the determining indicating the sensor not being the first sensor in the series of sensors. The first procedure may involve transmitting first data of the sensed at least one parameter via a second input/output (I/O) pin of the sensor. The second procedure may involve either or both of: (a) receiving second data from a preceding sensor in the series of sensors via a first I/O pin of the sensor; and (b) transmitting the first data and the second data via the second I/O pin.

In one aspect, an apparatus may include a sensor. The sensor may include a sensing circuit, a physical contact hardware, and a processing circuit coupled to the sensing circuit and the physical contact hardware. The sensing circuit may be capable of sensing at least one parameter and generating first data of the sensed at least one parameter. The processing circuit may be capable of determining a respective position of the sensor among a series of sensors when the sensor is implemented in the series of sensors. Based on a result of the determining, the processing circuit may be capable of performing either a first procedure, responsive to the result of the determining indicating the sensor being a first sensor in the series of sensors, or a second procedure responsive to the result of the determining indicating the sensor not being the first sensor in the series of sensors. The first procedure may involve the processing circuit transmitting the first data of the sensed at least one parameter via a second input/output (I/O) pin of the physical contact hardware. The second procedure may involve the processing circuit performing either or both of: (a) receiving second data from a preceding sensor in the series of sensors via a first I/O pin of the physical contact hardware; and (b) transmitting the first data and the second data via the second I/O pin.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Figure 1:
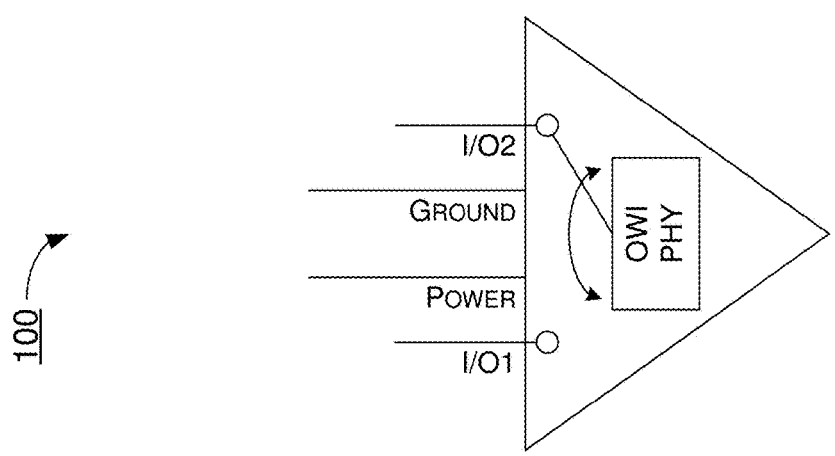
FIG. 1 is a functional diagram of an example sensor in accordance with an implementation of the present disclosure.

FIG. 1 illustrates an example sensor 100 in accordance with an implementation of the present disclosure. Sensor 100 may be implemented or otherwise utilized in various sensor systems such as, for example and without limitations, sensor system 200, sensor system 300 and sensor system 400 described below. In some implementations, sensor 100 may be a radar sensor. Alternatively, sensor 100 may be a Light Detection and Ranging (LiDAR) sensor, an image sensor, an acoustic sensor, a temperature sensor, a photonic sensor, a pressure sensor or another type of sensor.

Sensor 100 may be configured with a number of physical contacts, connectors or pins for external connection. Referring to FIG. 1, sensor 100 may include a first input/output (I/O) pin (denoted as "I/O1" in FIG. 1), a second I/O pin (denoted as "I/O2" in FIG. 1), a power pin and a ground pin. Each of first and second I/O pins may be used by sensor 100 to receive input data and provide output data. Power pin may be used by sensor 100 to receive power (e.g., direct-current (DC) power) from a power source (e.g., a battery of a vehicle). Ground pin may be connected to an electrical ground.

Sensor 100 may include a one-wire interface (OWI) physical layer hardware (denoted as "OWI PHY" in FIG. 1). In some implementations, OWI physical layer hardware may be shared by first and second I/O pins. For instance, OWI physical layer hardware may be switched between first and second I/O pins such that OWI physical layer hardware may be electrically connected to either of first and second I/O pins at a given time. Accordingly, OWI physical layer hardware may be switched to be electrically connected to either of first and second I/O pins to receive input data or to provide output data. In some alternative implementations, instead of one instance of OWI physical layer hardware, sensor 100 may include two instances of OWI physical layer hardware each dedicated and connected to a respective one of the first and second I/O pins.

Figure 2:
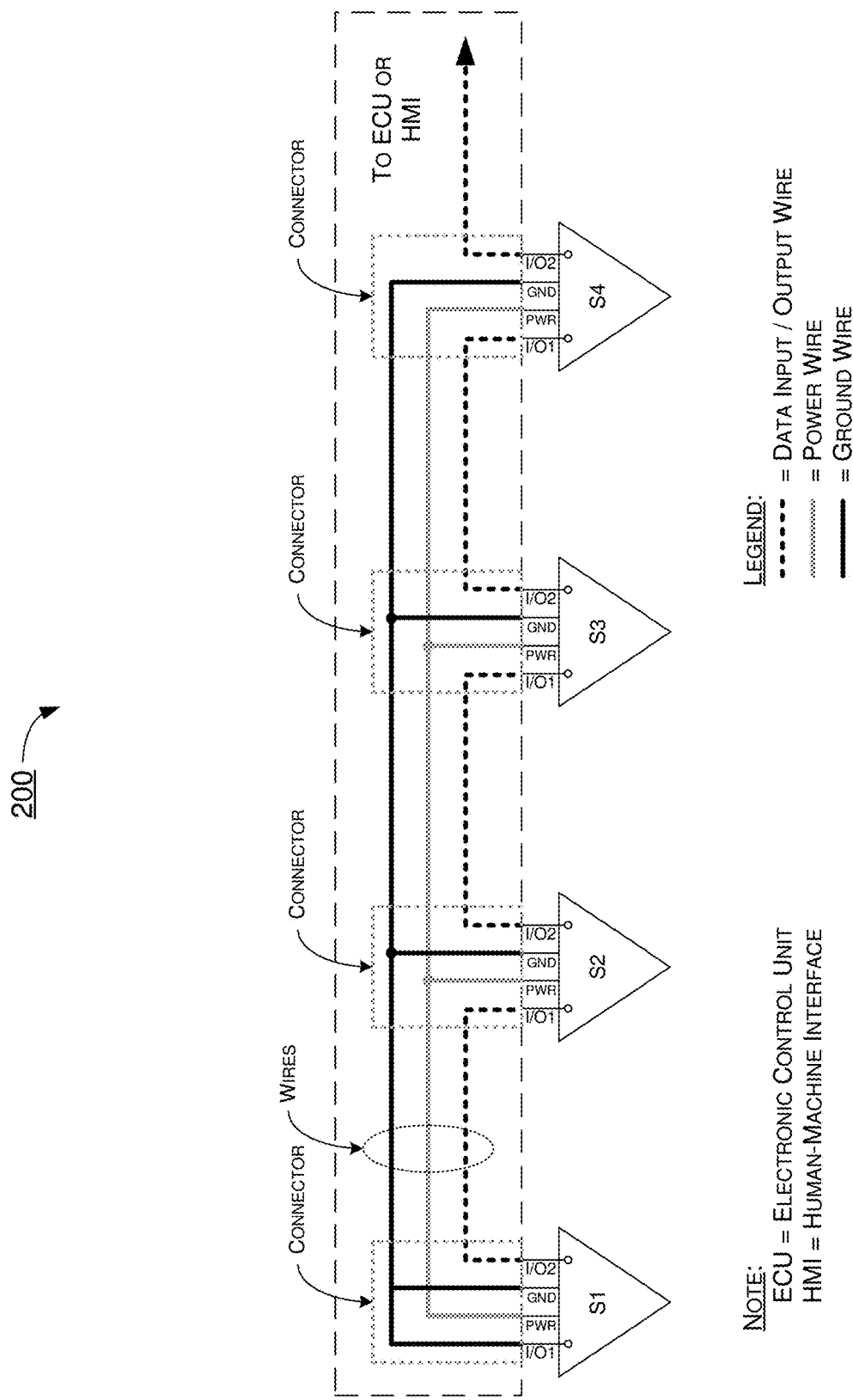
FIG. 2 is a diagram of an example sensor system in accordance with an implementation of the present disclosure.

FIG. 2 illustrates an example sensor system 200 in accordance with an implementation of the present disclosure. Sensor system 200 may include a plurality of sensors S1, S2, S3 and S4 that are interconnected via a multi-drop three-wire interface in which two of the three wires are connected in a daisy chain fashion while the remaining wire is connected in series. It is noteworthy that, although a certain number of sensors (i.e., number N=4) is shown in FIG. 2, concepts and schemes described herein are applicable to sensor systems with different numbers of sensors. That is, the scope of the concepts and schemes described herein with respect to FIG. 2 is not limited to the example shown in FIG. 2. Sensor 100 described above may be implemented as each of sensors S1, S2, S3 and S4 of sensor system 200.

Referring to FIG. 2, in sensor system 200, a first wire of the three wires (herein referred to as the "data I/O wire") may be connected in series between sensors S1, S2, S3, S4 and an optional electronic control unit (ECU) or human-machine interface (HMI) for transmission of input/output data. For instance, a first section of the first wire is connected between pin I/O2 of sensor S1 and pin I/O1 of sensor S2, a second section of the first wire is connected between pin I/O2 of sensor S2 and pin I/O1 of sensor S3, a third section of the first wire is connected between pin I/O2 of sensor S3 and pin I/O1 of sensor S4, and a fourth section of the first wire is connected between pin I/O2 of sensor S4 and the ECU/HMI. In cases in which there is no ECU, sensor system 200 may be implemented as or in an ECU-less parking assistance system (PAS).

Additionally, in sensor system 200, a second wire of the three wires (herein referred to as the "power wire") may be connected to sensors S1, S2, S3 and S4 in a daisy chain fashion to connect each of sensors S1, S2, S3 and S4 to a power source (not shown). For instance, the second wire may be connected to the power pin (denoted as "PWR" in FIG. 2) of each of sensors S1, S2, S3 and S4.

Moreover, in sensor system 200, a third wire of the three wires (herein referred to as the "ground wire") may be connected to sensors S1, S2, S3 and S4 in a daisy chain fashion to connect each of sensors S1, S2, S3 and S4 to an electrical ground. For instance, the third wire may be connected to the ground pin (denoted as "GND" in FIG. 2) of each of sensors S1, S2, S3 and S4.

As described below, upon installation of sensor system 200 (e.g., in a vehicle), each of sensors S1, S2, S3 and S4 may automatically determine a configuration of the sensors in sensor system 200. That is, according to the present disclosure, each of sensors S1, S2, S3 and S4 may automatically detect or otherwise determine its respective position (which corresponds to its unique ID) in a series or chain of multiple sensors formed by sensors S1, S2, S3 and S4. Advantageously, this avoids the time-consuming ID assignment process that is conventionally done manually. Moreover, potential mistakes due to human error in the process of ID assignment may also be avoided.

Under a proposed scheme in accordance with the present disclosure, pin I/O1 of sensor S1 may be shorted to electrical ground by being connected to the ground wire, as shown in FIG. 2, or to the power wire. This may be a way for sensor S1 to detect or otherwise determine its respective position or ID that it is the first sensor in the series or chain of multiple sensors formed by sensors S1, S2, S3 and S4. Upon detecting or otherwise determining that it is the first sensor in the series, sensor S1 may transmit to sensor S2 a signal that includes one or more of the following: (1) data of at least one parameter sensed by sensor S1, (2) a trigger signal, and (3) a result of the detection (e.g., sensor S1 is the first sensor in the series) or the ID of sensor S1. In some implementations, sensor S1 may also perform signal processing based on the data of the at least one parameter sensed by sensor S1. In some implementations, the signal may be transmitted from pin I/O2 of sensor S1 to pin I/O1 of sensor S2. Upon receiving the signal from sensor S1, sensor S2 may transmit an acknowledgment (ACK) signal back to sensor S1 and then perform detection of its respective position or ID. For instance, since sensor S2 directly receives signal/data from sensor S1 indicating that sensor S1 is the first sensor in the series, sensor S2 may determine that it is the second sensor in the series. Upon detecting or otherwise determining that it is the second sensor in the series, sensor S2 may transmit to sensor S3 a signal that includes one or more of the following: (1) data of at least one parameter sensed by sensor S2, (2) a trigger signal, and (3) a result of the detection from sensor S2 and sensor S1 (e.g., sensor S2 is the second sensor in the series and sensor S1 is the first sensor in the series) or the ID of sensor S2. In some implementations, sensor S2 may also perform signal processing based on aggregated data from sensor S1 and sensor S2. In some implementations, the signal may be transmitted from pin I/O2 of sensor S2 to pin I/O1 of sensor S3. Upon receiving the signal from sensor S2, sensor S3 may transmit an ACK signal back to sensor S2 and then perform detection of its respective position or ID. For instance, since sensor S3 directly receives signal/data from sensor S2 indicating that sensor S2 is the second sensor in the series, sensor S3 may determine that it is the third sensor in the series. Upon detecting or otherwise determining that it is the third sensor in the series, sensor S3 may transmit to sensor S4 a signal that includes one or more of the following: (1) data of at least one parameter sensed by sensor S3, (2) a trigger signal, and (3) a result of the detection from sensor S3, sensor S2 and sensor S1 (e.g., sensor S3 is the third sensor in the series, sensor S2 is the second sensor in the series, and sensor S1 is the first sensor in the series) or the ID of sensor S3. In some implementations, sensor S3 may also perform signal processing based on aggregated data from sensor S1, sensor S2 and sensor S3. In some implementations, the signal may be transmitted from pin I/O2 of sensor S3 to pin I/O1 of sensor S4. Upon receiving the signal from sensor S3, sensor S4 may transmit an ACK signal back to sensor S3 and then perform detection of its respective position or ID. For instance, since sensor S4 directly receives signal/data from sensor S3 indicating that sensor S3 is the third sensor in the series, sensor S4 may determine that it is the fourth sensor in the series. Upon detecting or otherwise determining that it is the fourth sensor in the series, sensor S4 may transmit to an ECU, in case sensor S4 is connected to the ECU, a signal that includes one or more of the following: (1) data of at least one parameter sensed by sensor S4, (2) a trigger signal, and (3) a result of the detection from sensor S4, sensor S3, sensor S2 and sensor S1 (e.g., sensor S4 is the fourth sensor in the series, sensor S3 is the third sensor in the series, sensor S2 is the second sensor in the series, and sensor S1 is the first sensor in the series) or the ID of sensor S4. In some implementations, sensor S4 may also perform signal processing based on aggregated data from sensor S1, sensor S2, sensor S3 and sensor S4. The at least one parameter sensed by each of sensors S1, S2, S3 and S4 may be, for example and without limitation, a distance, a temperature, an image, a pressure, a humidity level or a type of environmental parameter.

Under the proposed scheme, when pin I/O2 of a given sensor #N in a sensor system of N sensors (e.g., N=4 as shown in FIG. 2) is connected to an ECU, the ECU may transmit an ACK signal along with a "complete" signal to sensor #N to indicate that sensor #N (e.g., sensor S4 in sensor system 200) is the last sensor in the series or chain of multiple sensors. Under the proposed scheme, the "complete" signal may be propagated through the series of chain of sensors, from sensor #N to sensor #(N−1), from sensor #(N−1) to sensor #(N−2), . . . all the way to sensor #1. Upon receiving the "complete" signal, sensor #1 (e.g., sensor S1 in sensor system 200) may start the above-described detection process again. Under the proposed scheme, when sensor #N is connected to a HMI (e.g., in a ECU-less system), output protocol may be different and may require a different physical layer. Thus, the end of detection cycle (at sensor #N) may be available to the system.

Under the proposed scheme, features such as timeout and soft-reset may be implemented by or in individual sensors for self-diagnosis and fault detection. Moreover, at startup, default I/O of all sensors of sensor system 200 may be set to a predetermined I/O pin (e.g., pin I/O2 of each sensor). For instance, the OWI PHY may be set to "1" as default (and "0" for sensor #1).

Figure 3:
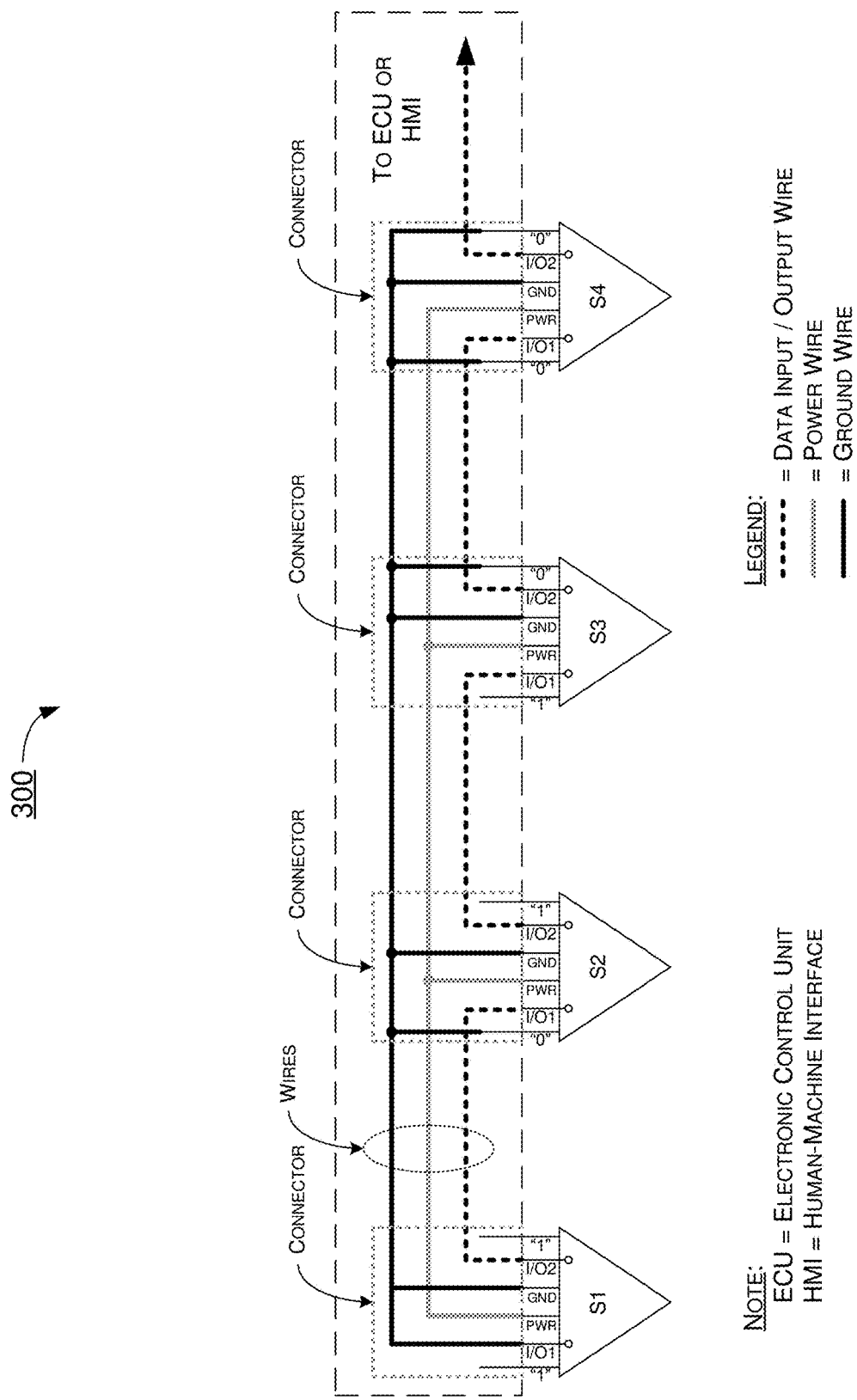
FIG. 3 is a diagram of an example sensor system in accordance with an implementation of the present disclosure.

FIG. 3 illustrates an example sensor system 300 in accordance with an implementation of the present disclosure. Sensor system 300 may include a plurality of sensors S1, S2, S3 and S4 that are interconnected via a multi-drop three-wire interface in which two of the three wires are connected in a daisy chain fashion while the remaining wire is connected in series. It is noteworthy that, although a certain number of sensors (i.e., number N=4) is shown in FIG. 3, concepts and schemes described herein are applicable to sensor systems with different numbers of sensors. That is, the scope of the concepts and schemes described herein with respect to FIG. 3 is not limited to the example shown in FIG. 3.

Under a proposed scheme in accordance with the present disclosure, a variation of sensor 100 described above may be implemented as each of sensors S1, S2, S3 and S4 of sensor system 300. That is, other than pins I/O1, PWR, GNG and I/O2, each of sensors S1, S2, S3 and S4 of sensor system 300 may additionally include two physical contacts, connectors or pins for sensor identification.

Referring to FIG. 3, in sensor system 300, a first wire of the three wires (herein referred to as the "data I/O wire") may be connected in series between sensors S1, S2, S3, S4 and an optional ECU or HMI for transmission of input/output data. For instance, a first section of the first wire is connected between pin I/O2 of sensor S1 and pin I/O1 of sensor S2, a second section of the first wire is connected between pin I/O2 of sensor S2 and pin I/O1 of sensor S3, a third section of the first wire is connected between pin I/O2 of sensor S3 and pin I/O1 of sensor S4, and a fourth section of the first wire is connected between pin I/O2 of sensor S4 and the ECU/HMI. In cases in which there is no ECU, sensor system 200 may be implemented as or in an ECU-less PAS.

Additionally, in sensor system 300, a second wire of the three wires (herein referred to as the "power wire") may be connected to sensors S1, S2, S3 and S4 in a daisy chain fashion to connect each of sensors S1, S2, S3 and S4 to a power source (not shown). For instance, the second wire may be connected to the power pin (denoted as "PWR" in FIG. 3) of each of sensors S1, S2, S3 and S4.

Moreover, in sensor system 300, a third wire of the three wires (herein referred to as the "ground wire") may be connected to sensors S1, S2, S3 and S4 in a daisy chain fashion to connect each of sensors S1, S2, S3 and S4 to an electrical ground. For instance, the third wire may be connected to the ground pin (denoted as "GND" in FIG. 3) of each of sensors S1, S2, S3 and S4.

As described below, upon installation of sensor system 300 (e.g., in a vehicle), each of sensors S1, S2, S3 and S4 may automatically determine a configuration of the sensors in sensor system 200. Thus, according to the present disclosure, each of sensors S1, S2, S3 and S4 may automatically detect or otherwise determine its respective position or ID in a series or chain of multiple sensors formed by sensors S1, S2, S3 and S4. Advantageously, this avoids the time-consuming ID assignment process that is conventionally done manually. Moreover, potential mistakes due to human error in the process of ID assignment may also be avoided.

In sensor system 300, as the two additional physical contacts, connectors or pins of sensor S1 may be unconnected to a power source or electrical ground, a voltage level at each of the two additional physical contacts, connectors or pins of sensor S1 may be floating. Hence, under a proposed scheme in accordance with the present disclosure, the voltage level at each of the two additional physical contacts, connectors or pins of sensor S1 may be equivalent to a binary value of "1" and, accordingly, sensor S1 may determine "11" to be its ID. Similarly, as the left one of the two additional physical contacts, connectors or pins of sensor S2 is connected to the ground wire while the right one of the two additional physical contacts, connectors or pins of sensor S2 is unconnected, sensor S2 may determine "01" to be its ID. Likewise, as the left one of the two additional physical contacts, connectors or pins of sensor S3 is unconnected while the right one of the two additional physical contacts, connectors or pins of sensor S3 is connected to the ground wire, sensor S3 may determine "10" to be its ID. Lastly, as both of the two additional physical contacts, connectors or pins of sensor S4 are connected to the ground wire, sensor S4 may determine "00" to be its ID. As the rest of the wiring configuration of the data I/O wire, the power wire and the ground wire in sensor system 300 with respect to sensors S1, S2, S3 and S4 is similar to that in sensor system 200, a detailed description thereof is not repeated in the interest of brevity.

Under the proposed scheme, features such as timeout and soft-reset may be implemented by or in individual sensors for self-diagnosis and fault detection. Moreover, at startup, default I/O of all sensors of sensor system 300 may be set to a predetermined I/O pin (e.g., pin I/O2 of each sensor). For instance, the OWI PHY may be set to "1" as default (and "0" for sensor #1).

Figure 4:
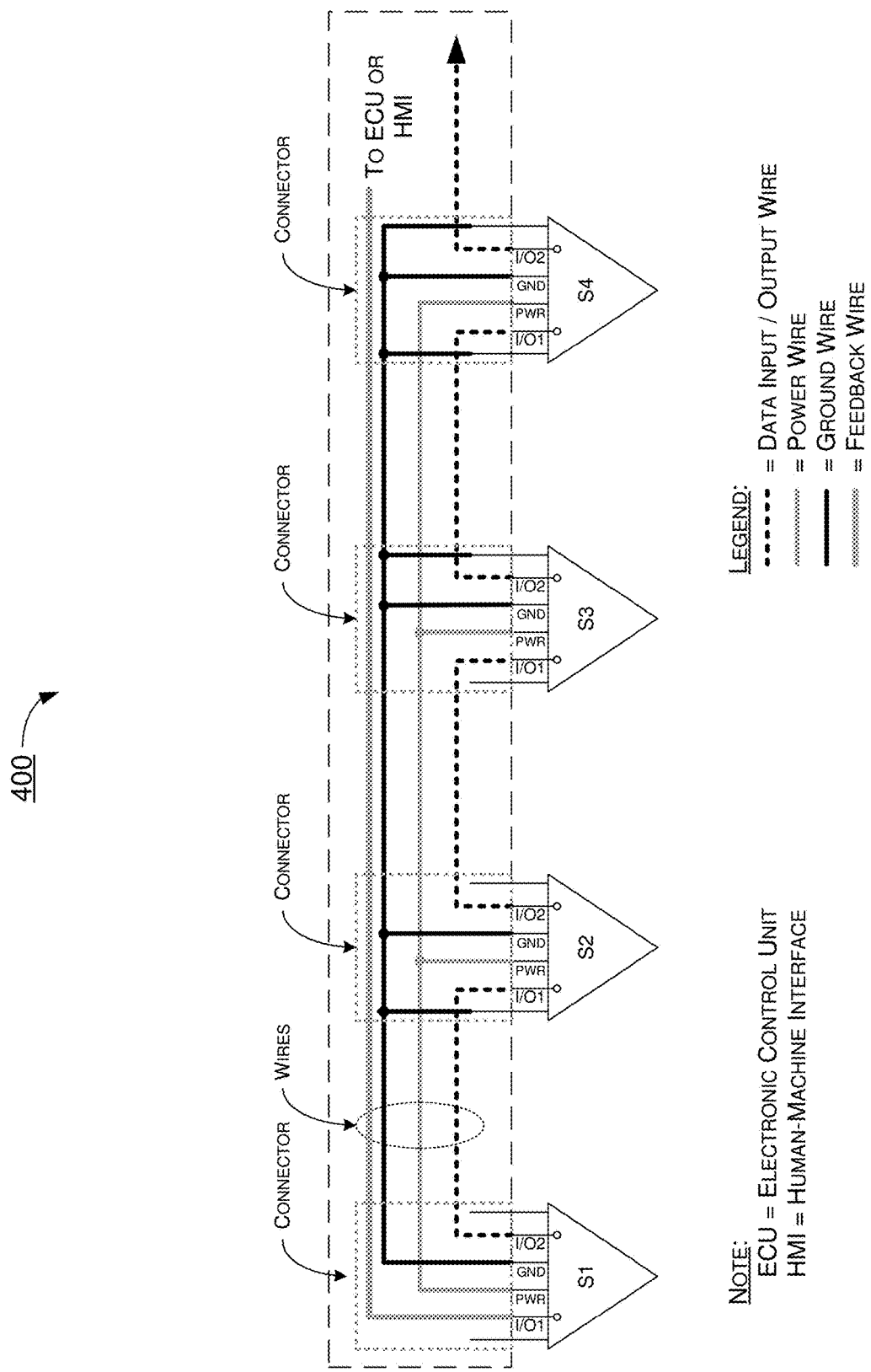
FIG. 4 is a diagram of an example sensor system in accordance with an implementation of the present disclosure.

FIG. 4 illustrates an example sensor system 400 in accordance with an implementation of the present disclosure. Sensor system 400 may include a plurality of sensors S1, S2, S3 and S4 that are interconnected via a multi-drop multi-wire interface in which two of the three wires are connected in a daisy chain fashion while one of the wires is connected in series. It is noteworthy that, although a certain number of sensors (i.e., number N=4) is shown in FIG. 4, concepts and schemes described herein are applicable to sensor systems with different numbers of sensors. That is, the scope of the concepts and schemes described herein with respect to FIG. 4 is not limited to the example shown in FIG. 4.

Under a proposed scheme in accordance with the present disclosure, while most features of sensor system 400 may be similar to those of sensor system 300, sensor system 400 may differ from sensor system 300 described above in that sensors S1, S2, S3 and S4 of sensor system 400 are interconnected via a multi-drop four-wire interface. Specifically, other than a data I/O wire, a power wire and a ground wire, sensor system 400 may additionally include a feedback wire. Referring to FIG. 4, instead of being connected to the ground wire as in sensor system 200 and sensor system 300, pin I/O1 of sensor S1 may be connected to the feedback wire. Accordingly, a feedback signal may be transmitted to an ECU by or through sensor S1 (e.g., for detection of sensor malfunction of any of sensors S1, S2, S3 and S4).

As an illustrative example, assuming sensor S3 is out of order and hence not functioning, based on timeout sensor (e.g., not receiving an ACK signal from S3 after a predetermined amount of time) S2 may transmit a feedback signal back to sensor S1 to indicate that sensor S3 is out of order. Accordingly, sensor S1 may propagate the feedback signal to the ECU.

Illustrative Implementations

Figure 5:
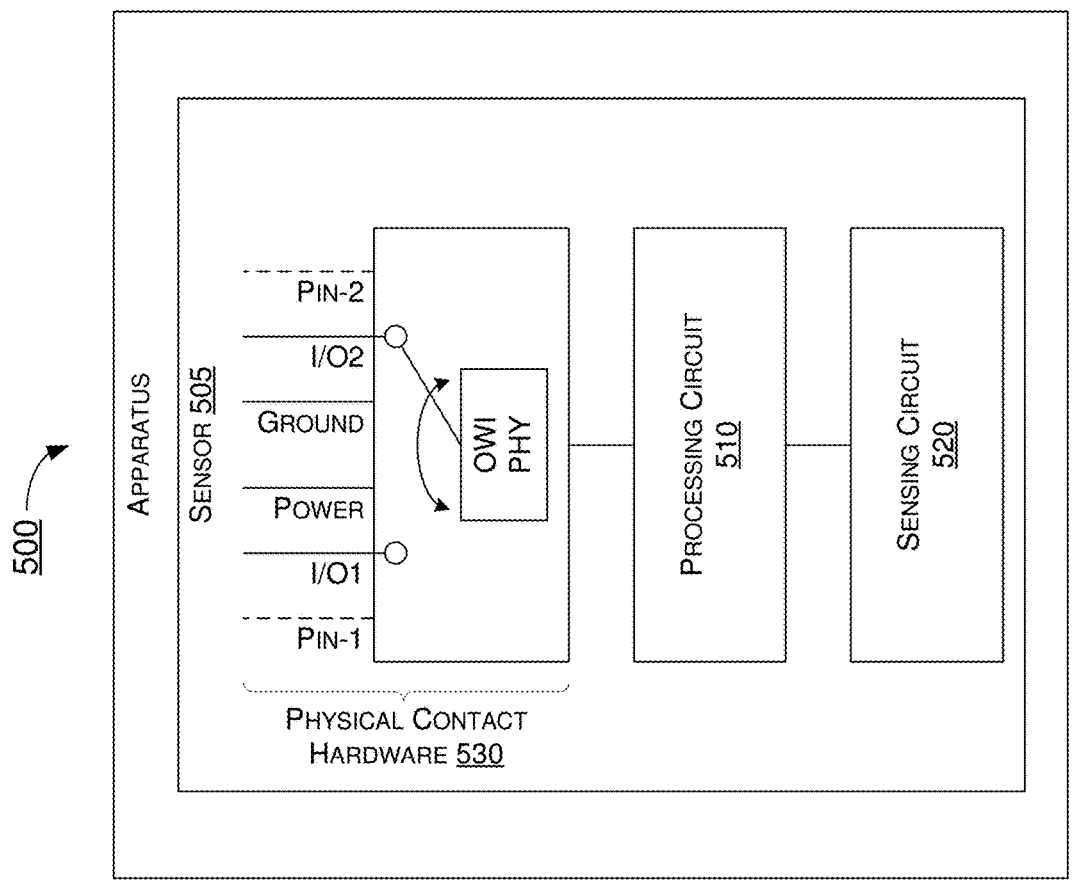
FIG. 5 is a block diagram of an example apparatus in accordance with an implementation of the present disclosure.

FIG. 5 illustrates an example apparatus 500 in accordance with an implementation of the present disclosure. Apparatus 500 may perform various functions to implement schemes, techniques, processes and methods described herein pertaining to a sensor system interconnect for automatic configuration of sensors of the sensor system, including the various schemes described above with respect to various proposed designs, concepts, schemes, systems and methods described above with respect to sensor 100, sensor system 200, sensor system 300 and sensor system 400 as well as process 600 described below. Apparatus 500 may be a part of an electronic apparatus such as, for example and without limitation, a sensor system used in an automatic parking assistance system (PAS).

In some implementations, apparatus 500 may be implemented in the form of one or more integrated-circuit (IC) chips such as, for example and without limitation, one or more single-core processors, one or more multi-core processors, or one or more complex-instruction-set-computing (CISC) processors. Apparatus 500 may include at least some of those components shown in FIG. 5 such as a sensor 505, for example, which may include a processing circuit 510. Sensor 505 may be an example implementation of sensor 100. Apparatus 500 may further include one or more other components not pertinent to the proposed scheme of the present disclosure (e.g., one or more other sensors, sensor interconnect, internal power supply and/or memory), and, thus, such component(s) of apparatus 500 are neither shown in FIG. 5 nor described below in the interest of simplicity and brevity.

In one aspect, sensor 505 as well as processing circuit 510 may be implemented in the form of one or more single-core processors, one or more multi-core processors, or one or more CISC processors. That is, even though a singular term "a processor" is used herein to refer to processing circuit 510, processing circuit 510 may include multiple processors in some implementations and a single processor in other implementations in accordance with the present disclosure. In another aspect, processing circuit 510 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, processing circuit 510 is a special-purpose machine specifically designed, arranged and configured to perform specific tasks including those pertaining to a sensor system interconnect for automatic configuration of sensors of the sensor system in accordance with various implementations of the present disclosure.

In some implementations, sensor 505 may also include a sensing circuit 520 and a physical contact hardware 530. Processing circuit 510 may be coupled to sensing circuit 520 and physical contact hardware 530. Sensing circuit 520 may be capable of sensing at least one parameter and generating first data of the sensed at least one parameter. For example and without limitation, as sensor 505 may be a LiDAR sensor, an image sensor, an acoustic sensor, a temperature sensor, a photonic sensor, a pressure sensor or another type of sensor. Accordingly, sensing circuit 520 may be capable of sensing at least a distance, a temperature, an image, a pressure, a humidity level or a type of environmental parameter, and sensing circuit 520 may also be capable of generating first data of a result of the sensing.

Physical contact hardware 530 may include a plurality of pins and one or more instances of OWI physical layer hardware. The plurality of pins may include a power pin, a ground pin, a first I/O pin (denoted in FIG. 5 and herein interchangeably referred to as "pin I/O1"), and a second I/O pin (denoted in FIG. 5 and herein interchangeably referred to as "pin I/O2"). Optionally, in some implementations, physical contact hardware 530 may further include a first pin (denoted in FIG. 5 and herein interchangeably referred to as "pin-1") and a second pin (denoted in FIG. 5 and herein interchangeably referred to as "pin-2"). Each of the pins of physical contact hardware 530 may, respectively, be connected to a power source, an electrical ground, another sensor or an ECU, or may be unconnected, as described above with respect to sensor system 200, sensor system 300 and sensor system 400. It is noteworthy that, although one instance of OWI physical layer hardware is shown in FIG. 5, in some alternative implementations, sensor 505 may include two instances of OWI physical layer hardware each dedicated and connected to a respective one of pin I/O1 and pin I/O2.

To aid better appreciation of features, functions and capabilities of apparatus 500, the following description of apparatus 500 is provided in the context of apparatus 500 being implemented in or as sensor system 200, sensor system 300 or sensor system 400 with sensor 505 being one of sensors S1, S2, S3 and S4 thereof.

Under various schemes and solutions in accordance with the present disclosure, processing circuit 510 may be capable of determining a respective position of sensor 505 among a series of sensors when sensor 505 is implemented in the series of sensors (e.g., when apparatus 500 includes multiple sensors as in sensor system 200, sensor system 300, sensor system 400 or a variation thereof). Based on a result of the determining, processing circuit 510 may be capable of performing either a first procedure, responsive to the result of the determining indicating sensor 505 being a first sensor in the series of sensors, or a second procedure, responsive to the result of the determining indicating sensor 505 not being the first sensor in the series of sensors. In performing the first procedure, processing circuit 510 may be capable of transmitting the first data of the sensed at least one parameter via pin I/O2 of physical contact hardware 530. In performing the second procedure, processing circuit 510 may be capable of performing either or both of: (a) receiving second data from one or more preceding sensors in the series of sensors via pin I/O1 of physical contact hardware 530, and (b) transmitting the first data and the second data via pin I/O2.

In some implementations, in determining the respective position of sensor 505 among the series of sensors, processing circuit 510 may be capable of determining a unique ID of sensor 505 based on the respective position of sensor 505 in the series of sensors. In some implementations, the first data may also include the unique ID of sensor 505.

In some implementations, in determining the respective position of sensor 505 among the series of sensors, processing circuit 510 may be capable of performing a number of operations. For instance, processing circuit 510 may be capable of determining a first voltage level on pin-1 of physical contact hardware 530 and a second voltage level on pin-2 of physical contact hardware 530. Additionally, processing circuit 510 may be capable of determining the respective position of sensor 505 based on binary values represented by the first voltage level and the second voltage level.

In some implementations, each of pin-1 and pin-2 of sensor 505 may be either unconnected or connected to an electrical ground.

In some implementations, processing circuit 510 may be further capable of determining the unique ID of sensor 505 based on the binary values represented by the first voltage level and the second voltage level.

In some implementations, processing circuit 510 may be further capable of performing additional operations. For instance, processing circuit 510 may be further capable of receiving a feedback signal from a succeeding sensor in the series of sensors via pin I/O2. Moreover, processing circuit 510 may be further capable of transmitting the feedback signal via pin I/O1. In some implementations, the feedback signal may indicate malfunction downstream of the succeeding sensor in the series of sensors.

In some implementations, in determining the respective position of sensor 505 among the series of sensors, processing circuit 510 may be capable of determining sensor 505 to be first sensor in the series of sensors responsive to pin I/O1 being connected to an electrical ground or a power source and pin I/O2 being connected to a succeeding sensor in the series of sensors.

In some implementations, in performing the first procedure, processing circuit 510 may also be capable of receiving an ACK signal from a succeeding sensor in the series of sensors via pin I/O2 responsive to transmitting the first data. Optionally, in performing the first procedure, processing circuit 510 may also perform signal processing based on the first data. In some implementations, in performing the second procedure, processing circuit 510 may be capable of receiving the ACK signal from the succeeding sensor in the series of sensors via pin I/O2 responsive to transmitting the first data. Alternatively, in performing the second procedure, processing circuit 510 may also be capable of receiving a complete signal (e.g., from an ECU) via pin I/O2 responsive to transmitting the first data. In some implementations, the complete signal may indicate that sensor 505 is a last sensor in the series of sensors. Optionally, in performing the second procedure, processing circuit 510 may also perform signal processing based on an aggregate of the first data and the second data.

Illustrative Processes

Figure 6:
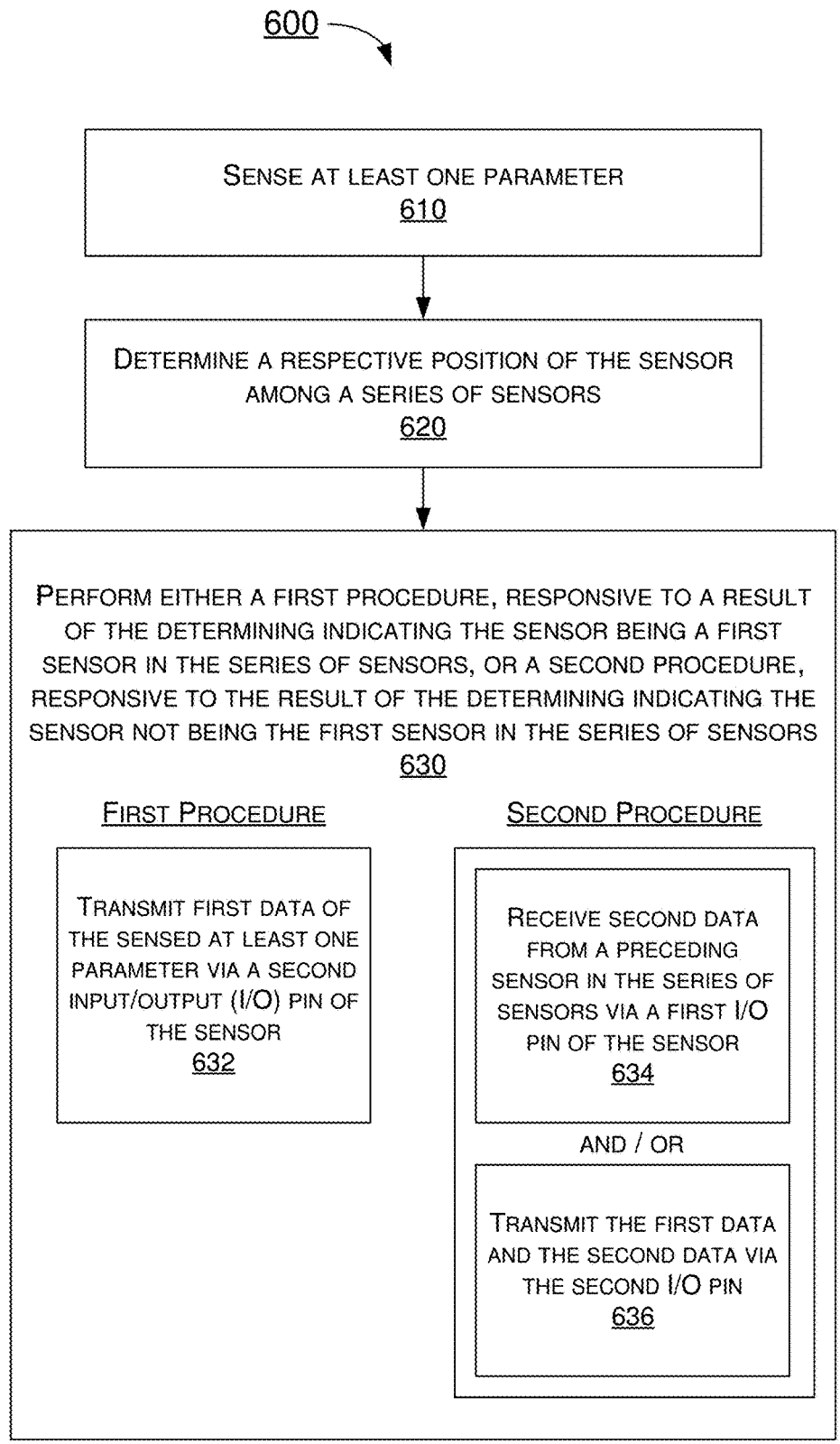
FIG. 6 is a flowchart of an example process in accordance with an implementation of the present disclosure.

FIG. 6 illustrates an example process 600 in accordance with an implementation of the present disclosure. Process 600 may represent an aspect of implementing various proposed designs, concepts, schemes, systems and methods described above. More specifically, process 600 may represent an aspect of the proposed concepts and schemes pertaining to a sensor system interconnect for automatic configuration of sensors of the sensor system. Process 600 may include one or more operations, actions, or functions as illustrated by one or more of blocks 610, 620 and 630 as well as sub-blocks 632, 634 and 636. Although illustrated as discrete blocks, various blocks of process 600 may be divided into additional blocks, combined into fewer blocks, or eliminated, depending on the desired implementation. Moreover, the blocks/sub-blocks of process 600 may be executed in the order shown in FIG. 6 or, alternatively in a different order. Furthermore, the blocks/sub-blocks of process 600 may be executed iteratively. Process 600 may be implemented by or in apparatus 500 as well as any variations thereof. Solely for illustrative purposes and without limiting the scope, process 600 is described below in the context of apparatus 500 as one of the sensors S1, S2, S3 and S4 of sensor system 200, sensor system 300, sensor system 400 or a variation thereof. Process 600 may begin at block 610.

At 610, process 600 may involve sensing circuit 520 of sensor 505 of apparatus 500 sensing at least one parameter (e.g., a distance). Process 600 may proceed from 610 to 620.

At 620, process 600 may involve processing circuit 510 of sensor 505 determining a respective position of sensor 505 among a series of sensors (e.g., when apparatus 500 includes additional sensors as in sensor system 200, sensor system 300 or sensor system 400). Process 600 may proceed from 620 to 630.

At 630, based on a result of the determining, process 600 may involve processing circuit 510 performing either of a first procedure, responsive to the result of the determining indicating sensor 505 being a first sensor in the series of sensors, or a second procedure, responsive to the result of the determining indicating sensor 505 not being the first sensor in the series of sensors.

In process 600, the firsts procedure and the second procedure may be represented by sub-blocks 632, 634 and 636, respectively.

At 632, in performing the first procedure, process 600 may involve processing circuit 510 transmitting first data of the sensed at least one parameter via pin I/O2 of sensor 505.

At 634, in performing the second procedure, process 600 may involve processing circuit 510 receiving second data from one or more preceding sensors in the series of sensors via pin I/O1 of sensor 505.

At 636, in performing the second procedure, process 600 may alternatively or additionally involve processing circuit 510 transmitting the first data and the second data via pin I/O2.

In some implementations, in determining the respective position of sensor 505 among the series of sensors comprises determining a unique ID of sensor 505 based on the respective position of sensor 505 in the series of sensors. In some implementations, the first data may also include the unique ID of sensor 505.

In some implementations, in determining the respective position of sensor 505 among the series of sensors, process 600 may involve processing circuit 510 performing a number of operations. For instance, process 600 may involve processing circuit 510 determining a first voltage level on pin-1 of sensor 505 and a second voltage level on pin-2 of sensor 505. Additionally, process 600 may involve processing circuit 510 determining the respective position of sensor 505 based on binary values represented by the first voltage level and the second voltage level. In some implementations, each of pin-1 and pin-2 of sensor 505 may be either unconnected or connected to an electrical ground.

In some implementations, process 600 may further involve processing circuit 510 determining a unique ID of sensor 505 based on the binary values represented by the first voltage level and the second voltage level. In some implementations, a respective binary value of the first voltage level on pin-1 or the second voltage level on pin-2 may be "0" responsive to pin-1 or pin-2 being connected to an electrical ground. Moreover, the respective binary value of the first voltage level on pin-1 or the second voltage level on pin-2 may be "1" responsive to pin-1 or pin-2 being unconnected with the first voltage level or the second voltage level being floating.

In some implementations, process 600 may further involve processing circuit 510 performing additional operations. For instance, process 600 may involve processing circuit 510 receiving a feedback signal from a succeeding sensor in the series of sensors via pin I/O2. Moreover, process 600 may involve processing circuit 510 transmitting the feedback signal to an ECU via pin I/O1. In some implementations, the feedback signal may indicate malfunction downstream of the succeeding sensor in the series of sensors.

In some implementations, in determining the respective position of sensor 505 among the series of sensors, process 600 may involve processing circuit 510 determining sensor 505 to be first sensor in the series of sensors responsive to pin I/O1 being connected to an electrical ground or a power source and pin I/O2 being connected to a succeeding sensor in the series of sensors.

In some implementations, in performing the first procedure, process 600 may further involve processing circuit 510 receiving an ACK signal from a succeeding sensor in the series of sensors via pin I/O2 responsive to transmitting the first data. Optionally, process 600 may also involve processing circuit 510 performing signal processing based on the first data.

In some implementations, in performing the second procedure, process 600 may further involve processing circuit 510 receiving an ACK signal from a succeeding sensor in the series of sensors via pin I/O2 responsive to transmitting the first data. Optionally, process 600 may also involve processing circuit 510 performing signal processing based on an aggregate of the first data and the second data.

Alternatively, in performing the second procedure, process 600 may further involve processing circuit 510 receiving a complete signal from an ECU via pin I/O2 responsive to transmitting the first data. Optionally, process 600 may also involve processing circuit 510 performing signal processing based on an aggregate of the first data and the second data. The complete signal may indicate that sensor 505 is a last sensor in the series of sensors.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   determining, by a sensor, a respective position of the sensor among a series of sensors; and
   based on a result of the determining, the sensor performing either:
   a first procedure responsive to the result of the determining indicating the sensor being a first sensor in the series of sensors, or
   a second procedure responsive to the result of the determining indicating the sensor not being the first sensor in the series of sensors,
   wherein the determining of the respective position of the sensor among the series of sensors comprises:
   determining that the sensor is the first sensor in the series of sensors responsive to a first input/output (I/O) pin of the sensor being connected to a ground wire or a power wire; and
   determining that the sensor is not the first sensor in the series of sensors responsive to the first I/O pin being connected to another sensor in the series of sensors,
   wherein the first procedure comprises transmitting sensing first of sensed at least one parameter via a second I/O pin of the sensor,
   wherein the second procedure comprises either or both of:
   receiving received data from the preceding sensor in the series of sensors via a first I/O pin of the sensor; and
   transmitting the sensing data and the received data via the second I/O pin,
   wherein a respective binary value of a first voltage level on a first pin of the sensor or a second voltage level on a second pin of the sensor is a first value responsive to the first pin or the second pin being connected to an electrical ground, and
   wherein the respective binary value of the first voltage level on the first pin or the second voltage level on the second pin is a second value responsive to the first pin or the second pin being unconnected with the first voltage level or the second voltage level being floating.

2. The method of claim 1, wherein the determining of the respective position of the sensor among the series of sensors comprises determining a unique identification (ID) of the sensor based on the respective position of the sensor in the series of sensors.

3. The method of claim 2, wherein the sensing data further comprises the unique ID of the sensor.

4. The method of claim 1, wherein the determining of the respective position of the sensor among the series of sensors comprises:
   determining the first voltage level on the first pin of the sensor and the second voltage level on the second pin of the sensor; and
   determining the respective position of the sensor based on binary values represented by the first voltage level and the second voltage level.

5. The method of claim 4, wherein each of the first pin and the second pin of the sensor is either unconnected or connected to an electrical ground.

6. The method of claim 4, further comprising:
   determining a unique identification (ID) of the sensor based on the binary values represented by the first voltage level and the second voltage level.

7. The method of claim 4, further comprising:
   receiving a feedback signal from a succeeding sensor in the series of sensors via the second I/O pin; and
   transmitting the feedback signal to an electronic control unit (ECU) via the first I/O pin,
   wherein the feedback signal indicates malfunction downstream of the succeeding sensor in the series of sensors.

8. The method of claim 1, wherein the determining of the respective position of the sensor among the series of sensors comprises determining the sensor to be first sensor in the series of sensors responsive to the first I/O pin being connected to an electrical ground or a power source and the second I/O pin being connected to a succeeding sensor in the series of sensors.

9. The method of claim 1, wherein the first procedure further comprises:
receiving an acknowledge (ACK) signal from a succeeding sensor in the series of sensors via the second I/O pin responsive to transmitting the sensing data; and
performing signal processing based on the sensing data.

10. The method of claim 1, wherein the second procedure further comprises:
receiving an acknowledge (ACK) signal from a succeeding sensor in the series of sensors via the second I/O pin responsive to transmitting the sensing data; and
performing signal processing based on an aggregate of the sensing data and the received data.

11. The method of claim 1, wherein the second procedure further comprises:
receiving a complete signal from an electronic control unit (ECU) via the second I/O pin responsive to transmitting the sensing data; and
performing signal processing based on an aggregate of the sensing data and the received data,
wherein the complete signal indicates that the sensor is a last sensor in the series of sensors.

12. An apparatus, comprising:
a sensor comprising:
a sensing circuit capable of sensing at least one parameter and generating sensing data of the sensed at least one parameter;
a physical contact hardware; and
a processing circuit coupled to the sensing circuit and the physical contact hardware, the processing circuit configured to perform operations comprising:
determining a respective position of the sensor among a series of sensors when the sensor is implemented in the series of sensors; and
based on a result of the determining, performing either:
a first procedure responsive to the result of the determining indicating the sensor being a first sensor in the series of sensors, or
a second procedure responsive to the result of the determining indicating the sensor not being the first sensor in the series of sensors,
wherein, in determining the respective position of the sensor among the series of sensors, processing circuit performs operations comprising:
determining that the sensor is the first sensor in the series of sensors responsive to a first input/output (I/O) pin of the sensor being connected to a ground wire or a power wire; and
determining that the sensor is not the first sensor in the series of sensors responsive to the first I/O pin being connected to another sensor in the series of sensors,
wherein the first procedure involves the processing circuit transmitting the sensing data of the sensed at least one parameter via a second I/O pin of the physical contact hardware,
wherein the second procedure involves the processing circuit performing either or both of:
receiving received data from the preceding sensor in the series of sensors via a first I/O pin of the physical contact hardware; and
transmitting the sensing data and the received data via the second I/O pin, and
wherein, in determining the respective position of the sensor among the series of sensors, the processing circuit is capable of:
determining a first voltage level on a first pin of the physical contact hardware and a second voltage level on a second pin of the physical contact hardware; and
determining the respective position of the sensor based on binary values represented by the first voltage level and the second voltage level.

13. The apparatus of claim 12, wherein, in determining the respective position of the sensor among the series of sensors, the processing circuit is capable of determining a unique identification (ID) of the sensor based on the respective position of the sensor in the series of sensors, and wherein the sensing data further comprises the unique ID of the sensor.

14. The apparatus of claim 12, wherein each of the first pin and the second pin of the sensor is either unconnected or connected to an electrical ground.

15. The apparatus of claim 12, wherein the processing circuit is further capable of determining a unique identification (ID) of the sensor based on the binary values represented by the first voltage level and the second voltage level.

16. The apparatus of claim 12, wherein the processing circuit is further capable of:
receiving a feedback signal from a succeeding sensor in the series of sensors via the second I/O pin; and
transmitting the feedback signal via the first I/O pin,
wherein the feedback signal indicates malfunction downstream of the succeeding sensor in the series of sensors.

17. The apparatus of claim 12, wherein, in determining the respective position of the sensor among the series of sensors, the processing circuit is capable of determining the sensor to be first sensor in the series of sensors responsive to the first I/O pin being connected to an electrical ground or a power source and the second I/O pin being connected to a succeeding sensor in the series of sensors.

18. The apparatus of claim 12, wherein:
the first procedure further involves the processing circuit receiving an acknowledge (ACK) signal from a succeeding sensor in the series of sensors via the second I/O pin responsive to transmitting the sensing data; and
either:
the second procedure further involves the processing circuit receiving the ACK signal from the succeeding sensor in the series of sensors via the second I/O pin responsive to transmitting the first data; or
the second procedure further involves the processing circuit receiving a complete signal via the second I/O pin responsive to transmitting the first data, the complete signal indicating that the sensor is a last sensor in the series of sensors.

* * * * *